March 5, 1935.   D. C. HEITSHU   1,993,405

TRACTOR

Filed Feb. 17, 1933

INVENTOR.
DANIEL C. HEITSHU
BY James A. Walsh
ATTORNEY

Patented Mar. 5, 1935

1,993,405

UNITED STATES PATENT OFFICE 1,993,405

TRACTOR

Daniel C. Heitshu, Racine, Wis., assignor to J. I. Case Company, Racine, Wis., a corporation Application February 17, 1933, Serial No. 657,175

16 Claims. (Cl. 74—11)

My present invention relates to tractors of the type embodying a power take-off shaft driven by the fly-wheel through intermediate engaging means, and independently of the transmission clutch, as disclosed in my copending application Serial No. 654,233, filed January 30, 1933, and consists in certain details of construction and arrangements of parts as will hereinafter appear.

Figure 1:
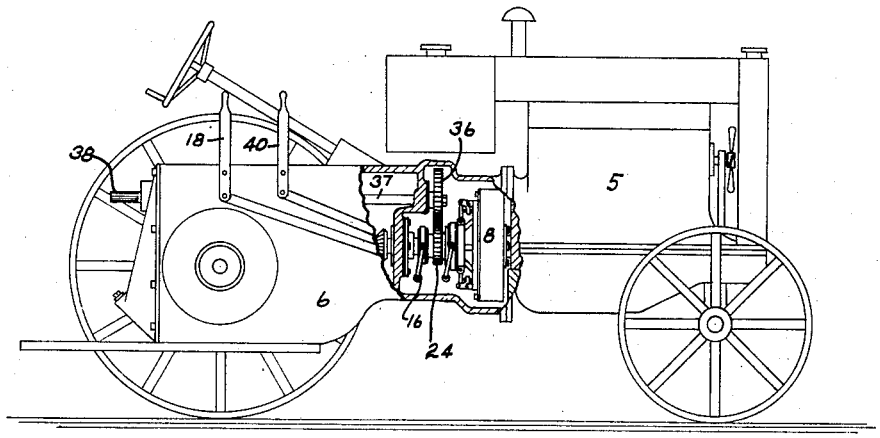
Figure 2:
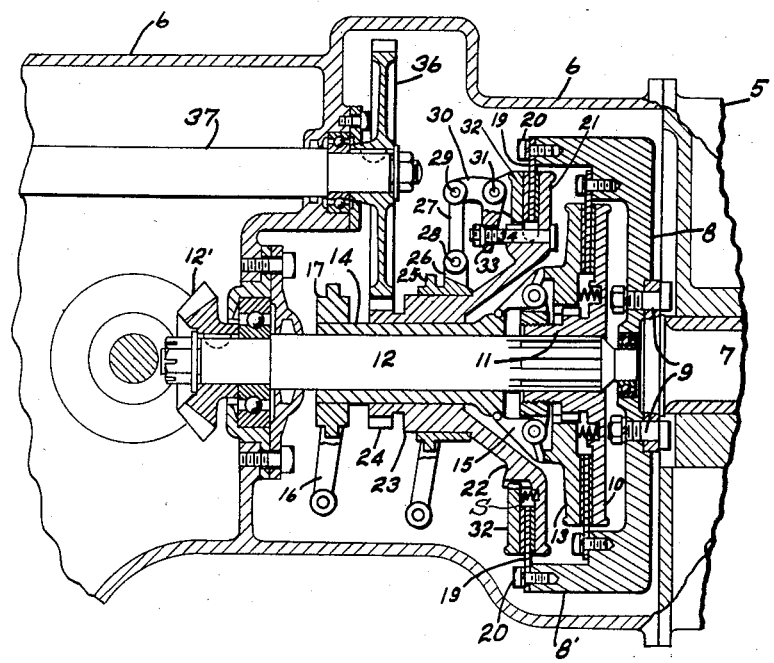

In the accompanying drawing, forming part hereof, Figure 1 is a side elevation of a tractor embodying my invention, its near drive-wheel being removed; and Fig. 2 is an enlarged detail showing my improvement.

In the drawing the numeral 5 indicates the engine-block, and 6 the transmission housing, which may be of any suitable arrangement. The crank-shaft 7 is secured to the fly-wheel 8 by bolts 9, on which fly-wheel is mounted a transmission clutch member 10 having a hub 11 supported on the clutch-shaft 12, and upon which hub an opposing clutch member 13 is adjustably mounted and adapted to engage a longitudinally shiftable sleeve 14 by the pivoted fingers 15, the sleeve being actuated by a fork 16 applied to a throw-out ring 17 connected to a lever 18 under control of the tractorman, as indicated in Fig. 1, all of which clutch parts and assemblage thereof are or may be common and well known, and substantially as disclosed in Letters Patent No. 1,804,113, issued May 5, 1931.

The fly-wheel 8 embodies a flange 8' to which a clutch-disk 19 is secured by bolts 20, which disk lies adjacent a main clutch member 21 forming part of a spider 22 terminating in a bearing 23 having a drive gear 24 integrally formed or connected therewith, and upon which bearing 23 a clutch throw-out collar 25 is loosely mounted, said collar 25 having a support 26 to which a link 27 is pivotally connected, at 28, and is also pivotally connected, at 29, to a bell-crank 30 connected at 31 to a movable clutch member 32, one arm of the bell-crank having an opening therein through which a bolt 34 extends and which is mounted in the spider 22, Fig. 2 showing the relation of the bell-crank and its associated parts to clutch member 32 when the clutch members are in engagement with disk 19. The drive gear 24 engages a gear 36 fixedly secured to a power take-off shaft 37 extending through the tractor, its rear end 38 having splines therein or otherwise arranged to receive a shaft (not shown) connected to an agricultural or other machine for actuating its mechanisms during field operations.

The clutch members 10—13 and 21—32, as indicated in Fig. 2, are in engagement, so that drive-gear 24 engaging gear 36 is rotating the latter to actuate the power shaft 37, and therefore the clutch-shaft 12 and its bevel gear 12' are rotating simultaneously with power shaft 37 when both clutches are so engaged as stated. When the fly-wheel clutch 10—13 is disengaged by shifting the sleeve 14 through the instrumentality of the throw-out 17 secured thereto and the lever 18, the power shaft 37 through its driving connection with clutch 21—32 will rotate independently of the clutch-shaft to actuate mechanisms connected to said power shaft when the tractor slows down in its speed of travel or stops. When it is desired to prevent rotation of the power shaft, as when the tractor and connected machine are transported over roads or in such circumstances that the machine or implement is not required to operate, the members 21—32 are declutched by manipulating lever 40 to slightly shift collar 25 on the bearing 23, which action causes link 27 to throw the bell crank arm 33 forwardly along the bolt 34, thus withdrawing clutch member 32, by its connection therewith at 31, from engagement with clutch-disk 19, whereupon shaft 37, gears 36, 24, and the spider 22 and its associated parts, will cease rotation, and consequently the mechanisms of an implement or machine connected to said power shaft will become inoperable. It will thus be seen that the driving connections for the power shaft may become actuated or idle wholly independently of the fly-wheel clutch and clutch-shaft 12, and that when said fly-wheel clutch 10—13 is engaged and clutch 21—32 disengaged the tractor is in condition for transporting without rotating the power shaft actuating parts.

The inner face of the main clutch member 21, it will be understood, is disengaged from disk 19 by releasing springs, as $s$ Fig. 2, shown in the lower portion of the clutch element, which separate the plates 21, 32, and, therefore, the spider 22 integrally formed with gear 24 is free to float on sleeve 14. The action is identical with that of plates 13 and 10 in the regular standard transmission clutch, as shown in Fig. 2. The clutch member 32 is clutched and declutched by the simple reciprocating action of bell-crank 30 on pin 31 anchored in the member 32, which action engages the faces of plates 21, 32, against disk 19 by means of the adjusting bolt 34, while reverse action of the bell-crank causes the plates to be released from said disk by the expanding action of spring $s$ between said members 21 and 32, as indicated. It will be further understood, of course, that plates 21, 32, are held in engagement by the center pin 28 passing pin 29 as the shifting collar 25 is moved toward the fly-wheel for engaging the clutch members and that the relation of said parts is reversed when disengaging the clutch.

When the collar 25 is moved forwardly toward the spider 22 the pivot 29 will be moved outwardly by the link 27, assuming a vertical position, and at the same time bell-crank 30, pivoting on pin 31, urges bolt 34 rearwardly, drawing plate 21 into contact with driving disk 19, which action draws driven plate 32 into contact with the rear side of said disk, the nut on the rear end of bolt 34 acting as a fulcrum for bell-crank arm 33, the latter having a forward reaction on pivot 31 anchored to the driven plate 32. When said collar 25 is moved rearwardly to release the clutch, link 27, pivotally connected at 28 to support 26 which is integral with collar 25, assumes an inclined position, thereby moving pivot 29 and arm 30 toward the center of the clutch structure, which action moves arm 33 toward the spider 22 and thereby removing tension from bolt 34, and plates 21, 32, are then forced apart by the separating spring s. As plate 21 is free to float on sleeve 14, and plate 32 is also free to float on spider 22, said plates automatically assume a released position about the driving disk 19, and which position is maintained until collar 25 is again moved forwardly to engage the clutch, as previously described.

I claim as my invention:

1. In a tractor having a fly-wheel, a transmission clutch supported and driven by the fly-wheel, said clutch having a shaft, a transmission in the tractor driven by the shaft, a power take-off shaft on the tractor having a gear thereon for actuating mechanisms adjacent thereto, a supplemental clutch concentrically mounted relatively to the clutch-shaft and engageable with and driven by the fly-wheel, and a gear associated with the supplemental clutch and engaging the power take-off shaft gear for actuating said power take-off shaft independently of the transmission clutch.

2. In a tractor having a fly-wheel, a transmission clutch supported and driven by the fly-wheel, said clutch having a shaft for actuating a transmission in the tractor, a power take-off shaft associated with the tractor for actuating mechanisms adjacent thereto, said power take-off shaft having a gear thereon, a supplemental clutch concentrically arranged relatively to the clutch-shaft and engageable with the rear side of the fly-wheel and driven thereby, and a gear associated with the latter clutch and engaging the gear on the power take-off shaft for actuating the latter.

3. In a tractor having a fly-wheel, a transmission clutch supported and driven by the fly-wheel, said clutch having a shaft for actuating a transmission in the tractor; a supplemental clutch associated with the fly-wheel and driven thereby embodying a spider, a bearing forming part of the spider and a gear associated with the bearing, said spider, bearing and gear comprising a unitary structure concentrically arranged relatively to and rotatable about the clutch-shaft; a power take-off shaft associated with the tractor and having a gear engaged and driven by said first mentioned gear to rotate the power take-off shaft for actuating mechanisms adjacent thereto; and means associated with the supplemental clutch to engage and disengage said clutch in relation to the fly-wheel for controlling rotation of said power take-off shaft.

4. In a tractor, a fly-wheel; a transmission system; a clutch supported and driven by the fly-wheel and including a shaft for driving the transmission; a power take-off shaft associated with the tractor and having a gear thereon for actuating mechanisms adjacent thereto; a supplemental clutch on the clutch-shaft associated with and driven by the fly-wheel, said supplemental clutch having a gear engaging and driving the power take-off shaft gear; and means associated with the supplemental clutch for adjusting the latter in relation to the fly-wheel to control the actuation of the power take-off shaft.

5. In a tractor, a fly-wheel, a transmission in the tractor, a clutch secured to and driven by the fly-wheel, said clutch having a shaft for driving the transmission, a supplemental clutch associated with the fly-wheel and driven thereby embodying an integrally formed bearing and a gear concentrically arranged relatively to and rotatable about the clutch-shaft, and a power take-off shaft associated with the tractor and having a gear engaging with and driven by said first mentioned gear for rotating the power take-off shaft to actuate machinery adapted to travel with the tractor.

6. In a tractor, a fly-wheel; a transmission in the tractor; a clutch secured to and driven by the fly-wheel, said clutch having a shaft for actuating the transmission; a supplemental clutch associated with the fly-wheel and driven thereby comprising an integrally formed main clutch member, spider, bearing and gear concentrically arranged relatively to and rotatable about said shaft, and also an opposed movable clutch member on the spider adapted to be clutched and declutched in relation to the main clutch member; a power take-off shaft on the tractor for actuating mechanisms adjacent thereto and having a gear engaging and driven by the first mentioned gear to rotate said power take-off shaft; and means for adjusting the movable clutch member in relation to the main clutch member to control the rotation of said power take-off shaft.

7. In a tractor, a fly-wheel; a transmission in the tractor; a clutch secured to and driven by the fly-wheel, said clutch having a shaft for actuating the transmission; a supplemental clutch rotatable about the shaft and engageable with and driven by the fly-wheel, embodying a main and a movable clutch member, the main member including a bearing and a gear; a power take-off shaft associated with the tractor for actuating mechanisms adjacent thereto and having a gear engaging and driven by the first mentioned gear to rotate the power take-off shaft; a throw-out collar on the bearing; means on the collar and connected to the movable clutch member for engaging and disengaging the supplemental clutch members; and means associated with the collar for adjusting the same to actuate the means on the collar for controlling the rotation of the power take-off shaft.

8. In a tractor, a fly-wheel; a transmission in the tractor; a clutch secured to and driven by the fly-wheel, said clutch having a shaft for actuating the transmission; a clutch-disk supported on the fly-wheel adjacent said clutch; a supplemental clutch concentrically mounted relatively to the shaft and having a main clutch member positioned at one side of the disk, said member including a bearing and a gear positioned at the opposite side of the disk; a throw-out collar on the bearing; a link mounted on the collar; a bell-crank connected to the link; a movable clutch member engageable with the disk; means connecting the bell-crank to the movable clutch member; a power take-off shaft on the tractor for actuating mechanisms adjacent thereto, said power take-off shaft having a gear engaging and driven by the first mentioned gear; and means for adjusting the collar on said bearing to actuate parts associated therewith to engage the supplemental clutch members with the clutch disk to be driven by the fly-wheel for rotating the power take-off shaft.

9. In a tractor, a fly-wheel, a transmission clutch secured to and driven by the fly-wheel, a shaft supported by the fly-wheel and a part of the tractor for driving a transmission in the tractor, a power take-off shaft associated with the tractor for actuating mechanisms adjacent thereto, said power take-off shaft having a gear thereon, a supplemental clutch on the clutch-shaft and driven by the fly-wheel, said transmission clutch, supplemental clutch and fly-wheel being assembled in concentric relation to the clutch-shaft, and a gear associated with the supplemental clutch concentrically mounted relatively to the clutch-shaft and engaging the gear on the power take-off shaft for actuating the latter.

10. In a tractor, a fly-wheel, a transmission clutch secured to and driven by the fly-wheel, a shaft supported by the fly-wheel and a part of the tractor for driving a transmission in the tractor, a supplemental clutch associated with and driven by the fly-wheel including a disk mounted on the rear side of the fly-wheel and clutch members at opposite sides of and adapted to engage the disk, one of said members terminating in a bearing having a driving gear associated therewith, a power take-off shaft on the tractor for operating mechanisms adjacent thereto, a gear on the power take-off shaft engaging and driven by the driving gear, and means on the bearing for clutching and declutching the supplemental clutch members to control rotation of the power take-off shaft.

11. In a tractor, a fly-wheel, means for driving the fly-wheel, a clutch secured to and driven by the fly-wheel, a shaft supported by the fly-wheel and a part of the tractor and having a gear for actuating a transmission, clutching means positioned rearwardly of said first mentioned clutch and engageable with and driven by the fly-wheel, said means including a gear, a power take-off shaft including a gear engaging and driven by said first mentioned gear, and means for adjusting the clutching means to actuate the power take-off shaft independently of or simultaneously with the clutch-shaft.

12. In a tractor, a fly-wheel, means for driving the wheel, a clutch secured to and driven by the wheel, a shaft mounted in said clutch and rotatable thereby to actuate a transmission in the tractor, means for engaging and disengaging the clutch to control rotation of the shaft, a supplemental clutch associated with the rear side of the fly-wheel and driven thereby and including a drive gear mounted in concentric relation to the shaft, and means independently of said first mentioned clutch-controlling means for adjusting the supplemental clutch whereby said drive gear will actuate mechanisms remote from the clutch-shaft independently of or simultaneously with the rotation of said clutch-shaft.

13. In a tractor, a fly-wheel, a clutch secured to and driven by the wheel, a shaft in the clutch and rotated thereby, means for adjusting the clutch to control rotation of the shaft, a disk supported on and rotating with the fly-wheel, a supplemental clutch having a clutch member positioned adjacent the disk and terminating in a drive gear concentrically mounted relatively to the shaft, a movable clutch member on the opposite side of the disk, means comprising a linkage connected to said latter clutch member and supported on the clutch-shaft, and means for actuating said linkage to engage and disengage said supplemental clutch members in relation to the disk whereby said drive gear will actuate mechanisms remote from the clutch-shaft independently of or simultaneously with the rotation of said shaft.

14. In a tractor, a fly-wheel; means for driving said wheel; a transmission clutch supported and driven by the wheel; a shaft mounted in the clutch and rotatable thereby; a disk secured to the fly-wheel; and a supplemental clutch associated with the disk including a bearing concentrically mounted in relation to the clutch-shaft and having arms supporting a clutch member adjacently to the disk, a movable clutch member associated with the opposite side of the disk, a clutch operator on the bearing, means connecting the latter clutch member and the operator, and means for actuating the clutch operator for adjusting the connecting means to engage and disengage the supplemental clutch members in relation to the disk.

15. In a tractor having a fly-wheel, a transmission clutch supported and driven by the fly-wheel, said clutch having a shaft, a transmission driven by said shaft, a supplemental clutch supported on the shaft and engaged with and driven by the fly-wheel, a power take-off shaft on the tractor for actuating mechanisms adjacent thereto, said power take-off shaft having a gear thereon, and a gear associated with the supplemental clutch and engaging the gear on the power take-off shaft for actuating the latter simultaneously with or independently of the transmission clutch.

16. In a tractor having a fly-wheel, a transmission clutch supported and driven by the fly-wheel, said clutch having a shaft; a transmission driven by the shaft; a supplemental clutch including a disk mounted on the fly-wheel, a main clutch member positioned on one side of the disk and mounted on the transmission shaft, said member embodying a gear, and a movable member on the opposite side of the disk; a bell-crank connected to the movable member; a guide associated with the main member for slidably supporting an arm of the bell-crank; a link connected to the bell-crank; a throw-out collar connected to the link; a power take-off shaft on the tractor for actuating mechanisms adjacent thereto, said power take-off shaft having a gear engaging and driven by the first mentioned gear; and means for adjusting the collar to actuate the link and bell-crank to engage and disengage the main and movable clutch members in relation to the disk for controlling the rotation of the power take-off shaft.

DANIEL C. HEITSHU.